United States Patent
Kumagai

(10) Patent No.: US 9,350,901 B2
(45) Date of Patent: May 24, 2016

(54) IMAGE PROCESSING APPARATUS THAT IS CAPABLE OF TWO-COLOR PRINTING, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Takekazu Kumagai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/658,030

(22) Filed: Oct. 23, 2012

(65) Prior Publication Data

US 2013/0100470 A1    Apr. 25, 2013

(30) Foreign Application Priority Data

Oct. 24, 2011   (JP) .................................. 2011-232777

(51) Int. Cl.
| | | |
|---|---|---|
| *H04N 1/60* | (2006.01) | |
| *G06K 9/00* | (2006.01) | |
| *G03F 3/08* | (2006.01) | |
| *H04N 1/46* | (2006.01) | |
| *H04N 1/56* | (2006.01) | |

(Continued)

(52) U.S. Cl.
CPC .............. *H04N 1/46* (2013.01); *H04N 1/00421* (2013.01); *H04N 1/00424* (2013.01); *H04N 1/00474* (2013.01); *H04N 1/00482* (2013.01); *H04N 1/233* (2013.01); *H04N 1/2338* (2013.01); *H04N 1/2369* (2013.01); *H04N 1/2392* (2013.01); *H04N 1/56* (2013.01)

(58) Field of Classification Search
None
See application file for complete search history.

(56) References Cited

U.S. PATENT DOCUMENTS

| | | | | |
|---|---|---|---|---|
| 4,668,978 A | * | 5/1987 | Gokita ........................... | 358/501 |
| 4,910,604 A | * | 3/1990 | Takei et al. .................... | 386/239 |
| 5,003,382 A | * | 3/1991 | Omi et al. ...................... | 358/537 |

(Continued)

FOREIGN PATENT DOCUMENTS

| | | |
|---|---|---|
| CN | 101951452 A | 1/2011 |
| JP | 10-285388 A | 10/1998 |

(Continued)

OTHER PUBLICATIONS

Office Action issued in CN201210407360.4 mailed Oct. 10, 2014. English translation provided.

(Continued)

*Primary Examiner* — Madelein A Nguyen
(74) *Attorney, Agent, or Firm* — Rossi, Kimms & McDowell LLP

(57) ABSTRACT

An image processing apparatus that is capable of reducing the printing time when printing data saved and is capable of two-color printing. A raster conversion unit generates raster image data by developing image information that shows an image expressed in arbitrary colors. A storage unit stores the raster image data converted by the raster conversion unit and a color mode that is specified from among "full color", "single color", and "two-color" when the raster image data is printed. A color conversion unit generates output image data by processing the raster image data according to the selected color mode. A control unit makes a printer unit print the output image data that is generated by processing the raster image data stored in the storage unit by the color conversion unit when being instructed to print the image.

19 Claims, 16 Drawing Sheets

(51) Int. Cl.
*H04N 1/00* (2006.01)
*H04N 1/23* (2006.01)

(56) References Cited

U.S. PATENT DOCUMENTS

| | | | |
|---|---|---|---|
| 5,311,336 A * | 5/1994 | Kurita et al. | 358/538 |
| 5,323,487 A * | 6/1994 | Morita | G06K 15/00 358/1.16 |
| 5,473,342 A * | 12/1995 | Tse et al. | 345/600 |
| 5,686,960 A * | 11/1997 | Sussman et al. | 348/218.1 |
| 5,805,175 A * | 9/1998 | Priem | 345/601 |
| 6,701,384 B1 | 3/2004 | Fukuta | |
| 6,771,386 B1 * | 8/2004 | Kato | H04N 1/2307 358/1.13 |
| 6,791,710 B1 * | 9/2004 | Bannai | 358/1.2 |
| 7,057,772 B1 * | 6/2006 | Bannai | 358/3.01 |
| 7,085,006 B2 * | 8/2006 | Yokoyama et al. | 358/1.9 |
| 7,664,320 B2 | 2/2010 | Yoshida et al. | |
| 8,184,309 B2 | 5/2012 | Koshika et al. | |
| 2002/0105661 A1 * | 8/2002 | Nishida | H04N 1/603 358/1.9 |
| 2003/0020951 A1 * | 1/2003 | Minowa | B41J 2/17566 358/1.15 |
| 2003/0123070 A1 * | 7/2003 | Weiner | H04N 1/40012 358/1.9 |
| 2004/0114172 A1 * | 6/2004 | Ohyama et al. | 358/1.13 |
| 2004/0141207 A1 * | 7/2004 | Warmus et al. | 358/1.18 |
| 2005/0168761 A1 * | 8/2005 | Yoshikawa et al. | 358/1.9 |
| 2005/0168764 A1 * | 8/2005 | Yamamura | 358/1.13 |
| 2006/0125857 A1 * | 6/2006 | Silverbrook | B41J 2/2135 347/12 |
| 2006/0187506 A1 * | 8/2006 | Minamino | 358/518 |
| 2006/0221358 A1 * | 10/2006 | Takahashi | 358/1.1 |
| 2006/0279764 A1 * | 12/2006 | Shimada | 358/1.14 |
| 2006/0279780 A1 * | 12/2006 | Anno et al. | 358/1.15 |
| 2007/0200909 A1 * | 8/2007 | Yoder et al. | 347/171 |
| 2007/0216920 A1 * | 9/2007 | Watanabe | 358/518 |
| 2007/0253039 A1 * | 11/2007 | Ariga | 358/518 |
| 2008/0037054 A1 * | 2/2008 | Hasegawa et al. | 358/1.15 |
| 2008/0186526 A1 * | 8/2008 | Kidani et al. | 358/1.13 |
| 2008/0192271 A1 * | 8/2008 | Kato et al. | 358/1.9 |
| 2009/0147313 A1 * | 6/2009 | Miyagi et al. | 358/2.1 |
| 2009/0185205 A1 * | 7/2009 | Nakajima | 358/1.9 |
| 2009/0225336 A1 * | 9/2009 | Siemens | H04N 1/58 358/1.9 |
| 2009/0244620 A1 * | 10/2009 | Takahashi et al. | 358/1.15 |
| 2010/0027038 A1 * | 2/2010 | Miyagi | 358/1.9 |
| 2010/0027040 A1 * | 2/2010 | Kuroda | 358/1.9 |
| 2010/0053709 A1 * | 3/2010 | Minami et al. | 358/518 |
| 2010/0067058 A1 * | 3/2010 | Yamazaki | 358/3.06 |
| 2010/0202000 A1 * | 8/2010 | Gotoh | 358/1.9 |
| 2011/0007355 A1 * | 1/2011 | Hibino | 358/1.15 |
| 2011/0123235 A1 * | 5/2011 | Matsuzaki | 399/301 |
| 2011/0134476 A1 * | 6/2011 | Takashima | 358/1.15 |
| 2011/0149315 A1 * | 6/2011 | Yamazaki | 358/1.9 |
| 2011/0205566 A1 * | 8/2011 | Aritomi | B41J 2/2103 358/1.9 |
| 2012/0050763 A1 * | 3/2012 | Takeishi | H04N 1/642 358/1.9 |
| 2012/0327488 A1 * | 12/2012 | Ito | 358/530 |
| 2013/0135632 A1 * | 5/2013 | Yamada | 358/1.9 |

FOREIGN PATENT DOCUMENTS

| | | |
|---|---|---|
| JP | 2007088783 A | 4/2007 |
| JP | 2008152668 A | 7/2008 |
| JP | 2008168600 A | 7/2008 |
| JP | 2010-288076 A | 12/2010 |
| JP | 2011175318 A | 9/2011 |

OTHER PUBLICATIONS

Japanese Office Action issued in Japanese counterpart application No. JP2011-232777, dated Sep. 8, 2015.

* cited by examiner

IMAGE PROCESSING APPARATUS THAT IS CAPABLE OF TWO-COLOR PRINTING, CONTROL METHOD THEREFOR, AND STORAGE MEDIUM STORING CONTROL PROGRAM THEREFOR

BACKGROUND OF THE INVENTION

1. Field of the Invention

The present invention relates to an image processing apparatus that is capable of two-color printing, a control method therefor, and a storage medium storing control program therefor.

2. Description of the Related Art

There are some printing apparatuses that are capable of two-color printing using two colors designated in addition to full color printing and monochrome printing (see Japanese Laid-Open Patent Publication (Kokai) No. 2010-288076 (JP 2010-288076A)). Usually, a maintenance support contract for a printing apparatus like a multifunctional peripheral device offers service to collect a usage fee according to a printing sheet count. A usage fee per sheet varies depending on number of colors (full color, two-color, or monochrome). The usage fee per sheet for the two-color printing is cheaper than that for the full color printing.

Moreover, the printing apparatus disclosed in JP 2010-288076A saves PDL (Page Description Language) data, which is outputted from the printer driver of a PC connected via a network, into a document storage area inside or outside of the printing apparatus (see paragraph 0015). The PDL data saved in the document storage area can be printed in response to a user's operation.

However, the above-mentioned technique has a problem that a development process, which is necessary to develop the PDL data to raster image data when printing the PDL data saved in the document storage area, becomes a neck that consumes time.

Japanese Laid-Open Patent Publication (Kokai) No. H10-285388 (JP H10-285388A) discloses a technique that saves raster image data that is obtained by developing the PDL data and omits the development process at the time of printing in order to reduce printing time. However, JP H10-285388A does not suggest a process in the two-color printing.

SUMMARY OF THE INVENTION

The present invention provides an image processing apparatus, a control method therefor, and a storage medium storing control program therefor, which are capable of reducing the printing time when printing data saved and are capable of two-color printing.

Accordingly, a first aspect of the present invention provides an image processing apparatus that is capable of two-color printing comprising a raster conversion unit configured to generate raster image data by developing image information that shows an image expressed in arbitrary colors, a storage unit configured to store the raster image data converted by the raster conversion unit and a color mode that is specified from among "full color", "single color", and "two-color" when the raster image data is printed, a color conversion unit configured to generate output image data by processing the raster image data according to the selected color mode, and a control unit configured to make a printer unit print the output image data that is generated by processing the raster image data stored in the storage unit by the color conversion unit when being instructed to print the image.

Accordingly, a second aspect of the present invention provides a control method for an image processing apparatus that is capable of two-color printing comprising a raster conversion step of generating raster image data by developing image information that shows an image expressed in arbitrary colors, a storing step of storing the raster image data converted in the raster conversion step and a color mode that is specified from among "full color", "single color", and "two-color" when the raster image data is printed into a storage unit, a color conversion step of generating output image data by processing the raster image data according to the selected color mode, a printing step of making a printer unit print the output image data that is generated by processing the raster image data stored in the storage unit in the color conversion step when being instructed to print the image, and a transmitting step of transmitting selected one of the raster image data and the output image data, when being instructed to transmit an image.

Accordingly, a third aspect of the present invention provides A non-transitory computer-readable storage medium storing a control program causing a computer to execute the control method according to the second aspect.

According to the present invention, an image processing apparatus, a control method therefor, and a storage medium storing control program therefor, which are capable of reducing the printing time when printing data saved and are capable of two-color printing can be provided.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
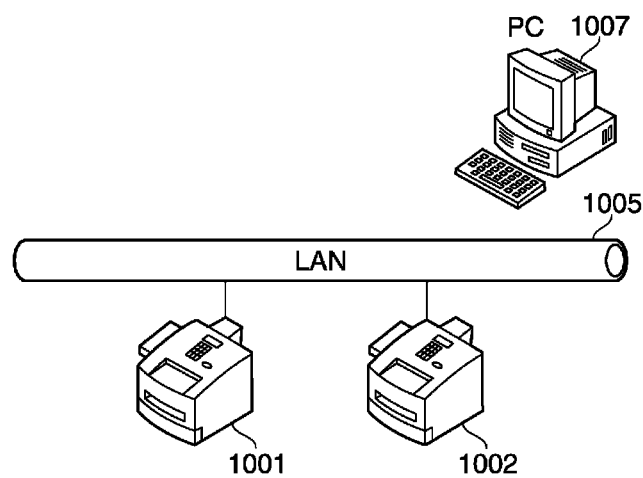
FIG. 1 is a view schematically showing a configuration of a system including an image processing apparatus according to an embodiment of the present invention.

FIG. 1 is a view schematically showing a configuration of an image processing system 200 including an image processing apparatus according to an embodiment of the present invention.

In FIG. 1, image processing apparatuses 1001 and 1002, and a PC 1007 are connected to a LAN and can communicate mutually. Then, the PC 1007 can supply PDL jobs to the image processing apparatuses 1001 and 1002.

The image processing apparatuses 1001 and 1002 can print data according to instructions of the supplied PDL jobs, and can save raster image data that is obtained by developing PDL data contained in the PDL jobs. Moreover, the image processing apparatuses 1001 and 1002 can transmit the raster image data to the PC 1007.

Since the configurations of the image processing apparatuses 1001 and 1002 are identical, the image processing apparatus 1001 will be described as a representative in the following description.

Figure 2:
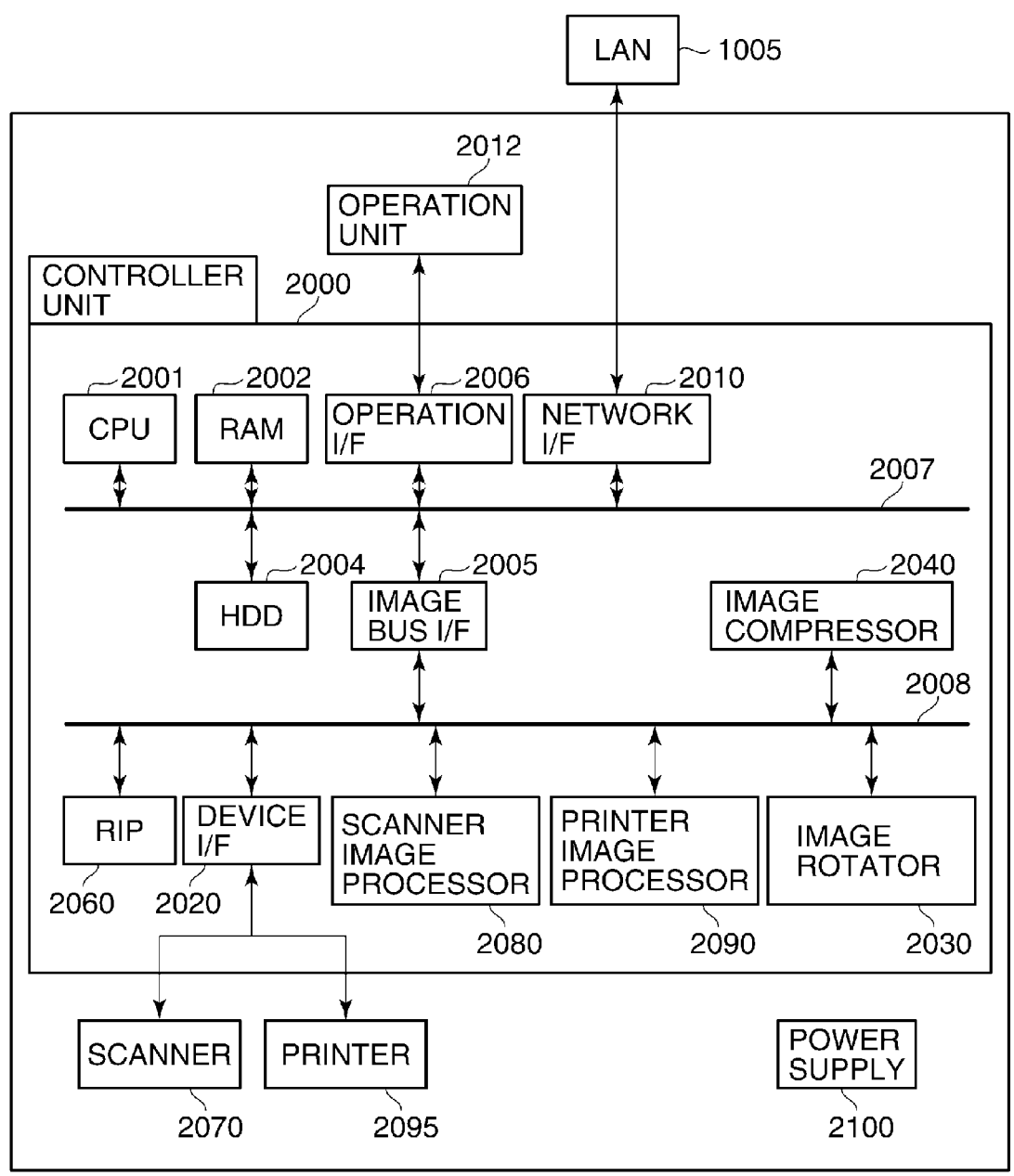
FIG. 2 is a block diagram schematically showing a hardware configuration of the image processing apparatus shown in FIG. 1.

FIG. 2 is a block diagram schematically showing a hardware configuration of the image processing apparatus 1001 shown in FIG. 1. As shown in FIG. 2, the image processing apparatus 1001 includes a controller unit 2000 and an operation unit 2012.

The controller unit 2000 is connected to a scanner 2070 that is an image input device, and a printer 2095 that is an image output device. The controller unit 2000 controls the scanner 2070 and the printer 2095 so as to achieve a copy function to print image data read by the scanner 2070 by the printer 2095.

The controller unit 2000 controls I/O of image data and device information by connecting to the LAN 1005. Specifically, the controller unit 2000 is provided with a CPU 2001, and the CPU 2001 starts an operating system (OS) by a boot program stored in an HDD (a hard disk drive) 2004.

Then, the CPU 2001 performs various processes by executing application programs stored in the HDD 2004 on the OS. A RAM 2002 is used as a workspace of the CPU 2001.

The RAM 2002 provides an image memory area to memorize image data temporarily in addition to the workspace. The HDD 2004 functions as a storage unit that stores image data, user information, and device-setting information in addition to the above-mentioned application program. It should be noted that an SSD (a solid state drive) that is connectable with the same interface as the HDD may be used in place of the HDD 2004.

The RAM 2002 is connected to the CPU 2001 through a system bus 2007. Furthermore, an operation I/F 2006 and a network I/F 2010 and an image-bus I/F 2005 are connected to the CPU 2001 as various interfaces.

The operation I/F 2006 is an interface with the operation unit 2012, and outputs the image data displayed on the operation unit 2012 to the operation unit 2012. The operation I/F 2006 sends information inputted by a user through the operation unit 2012 to the CPU 2001.

The network I/F 2010 is connected to the LAN 1005, and performs transmission and receptions of information among the apparatuses on the LAN 1005 via the LAN 1005.

An image bus I/F 2005 is a bus bridge that connects the system bus 2007 with an image bus 2008 that transmits image data at high speed, and converts a data structure.

The image bus 2008 consists of a PCI bus or IEEE1394. An RIP (a raster image processor) 2060, a device I/F 2020, a scanner image processor 2080, a printer image processor 2090, an image rotator 2030, and an image compressor 2040 are connected to the image bus 2008.

The RIP 2060 is a raster conversion unit that develops image information (PDL data) included in a PDL job to a bitmap image that is raster image data. The scanner 2070 and the printer 2095 are connected to the device I/F 2020. The device I/F 2020 converts the image data between a synchronous system and an asynchronous system.

The scanner image processor 2080 corrects, processes, and edits inputted image data. The printer image processor 2090 corrects the raster image data to be printed depending on a characteristic of the printer, and changes a resolution. The image rotator 2030 rotates the image data.

The image compressor 2040 compresses multilevel image data into JPEG data, compresses binary image data into JBIG data, MMR data, MH data, etc., and decompresses the compressed data.

A power supply 2100 transforms a current supplied from outside, converts AC into DC, and supplies the current to the controller unit 2000. A switch provided on the operation unit 2012 turns ON and OFF the power supply.

Figure 3:
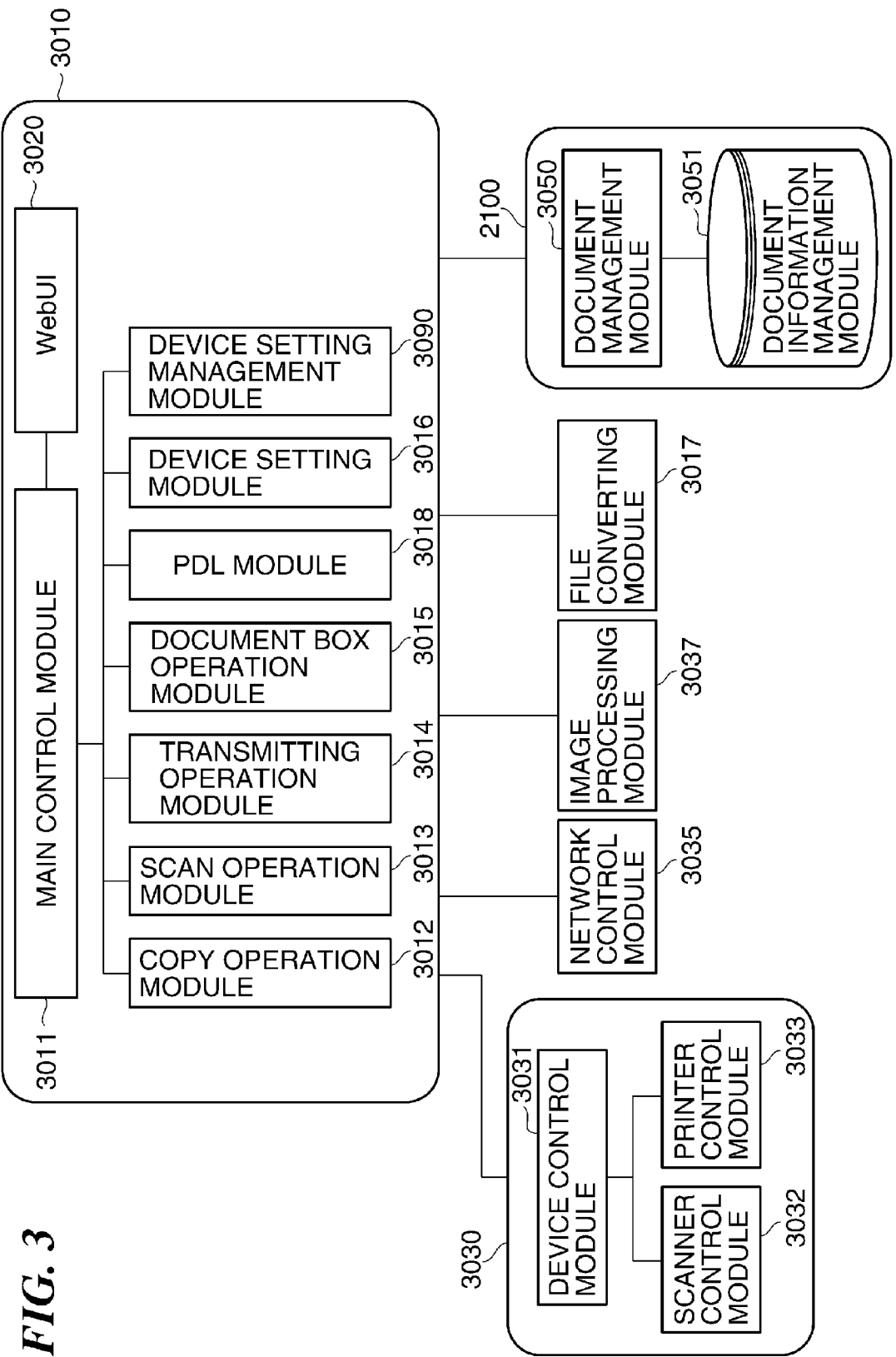
FIG. 3 is a block diagram schematically showing a software configuration of the image processing apparatus shown in FIG. 1.

FIG. 3 is a view schematically showing a software configuration of the image processing apparatus 1001 shown in FIG. 1. As shown in FIG. 3, the software configuration of the image processing apparatus 1001 consists of an operation-unit application 3010, a device module 3030, a data management module 3100, a network control module 3035, an image processing module 3037, and a file converting module 3017.

The operation-unit application 3010 comprises the following control modules, and performs a process according to an operation by a user through the operation unit 2012.

A main control module 3011 controls fundamental input and output, such as a screen displaying and a touch-panel operation by a user. A WebUI module 3020 provides a user interface similar to a screen displayed on the operation unit 2012 as a Web application.

The WebUI module 3020 displays a UI screen on a Web browser of the PC 1007 that is connected to the LAN 1005, receives an operation on the Web browser, and performs a process according to the operation.

Using the device module 3030, a copy operation module 3012 performs a copy operation that reads an original and copies it on a recording sheet.

Using the device module 3030 and the document management module 3050, a scan operation module 3013 reads an original and converts it into electronic image data, and stores the data into a document box or transmits the data to a device on the LAN 1005.

Using the device module 3030, a transmitting operation module 3014 transmits the image data showing the read original as an E-mail or transmits it to a file server.

Using the document management module 3050 and the device module 3030, a document box operation module 3015 displays, prints, and transmits the image data saved in the document box.

Using a device setting management module 3090, a device setting module 3016 refers to a device setting and changes it.

The device module 3030 comprises a scanner control module 3032 that controls the scanner 2070, a printer control module 3033 that controls the printer 2095, and a device control module 3031 that controls the scanner control module 3032 and the printer control module 3033.

The document management module 3050 creates, changes and deletes documents that consist of files like image data saved in the HDD 2004, and folders that contain documents. The document management module 3050 changes attribute information about a folder, and saves a document temporarily. The information is managed by a document information management module 3051.

A file converting module 3017 converts image data in JPEG, MH, MMR, JBIG, and TIFF formats into PDF (Portable Document Format) or XPS (XML Paper Specification), or converts oppositely.

The image processing module 3037 converts a full color image into a black-and-white image, a single color image, a two-color image, etc., and enlarges or contracts the image. The image processing module 3037 functions as a color conversion unit that processes the saved raster image data according to the selected color mode to convert it into output image data expressed by the color specified in the color mode, and generates new image data.

The network control module 3035 controls a network.

In the above-mentioned configuration of the embodiment, the PC 1007 supplies a PDL job to the image processing apparatus 1001 to save image data into the HDD 2004. The process therefor will be described first. Then, the process for printing the saved image data by the image processing apparatus 1001 will be described.

Figure 4:
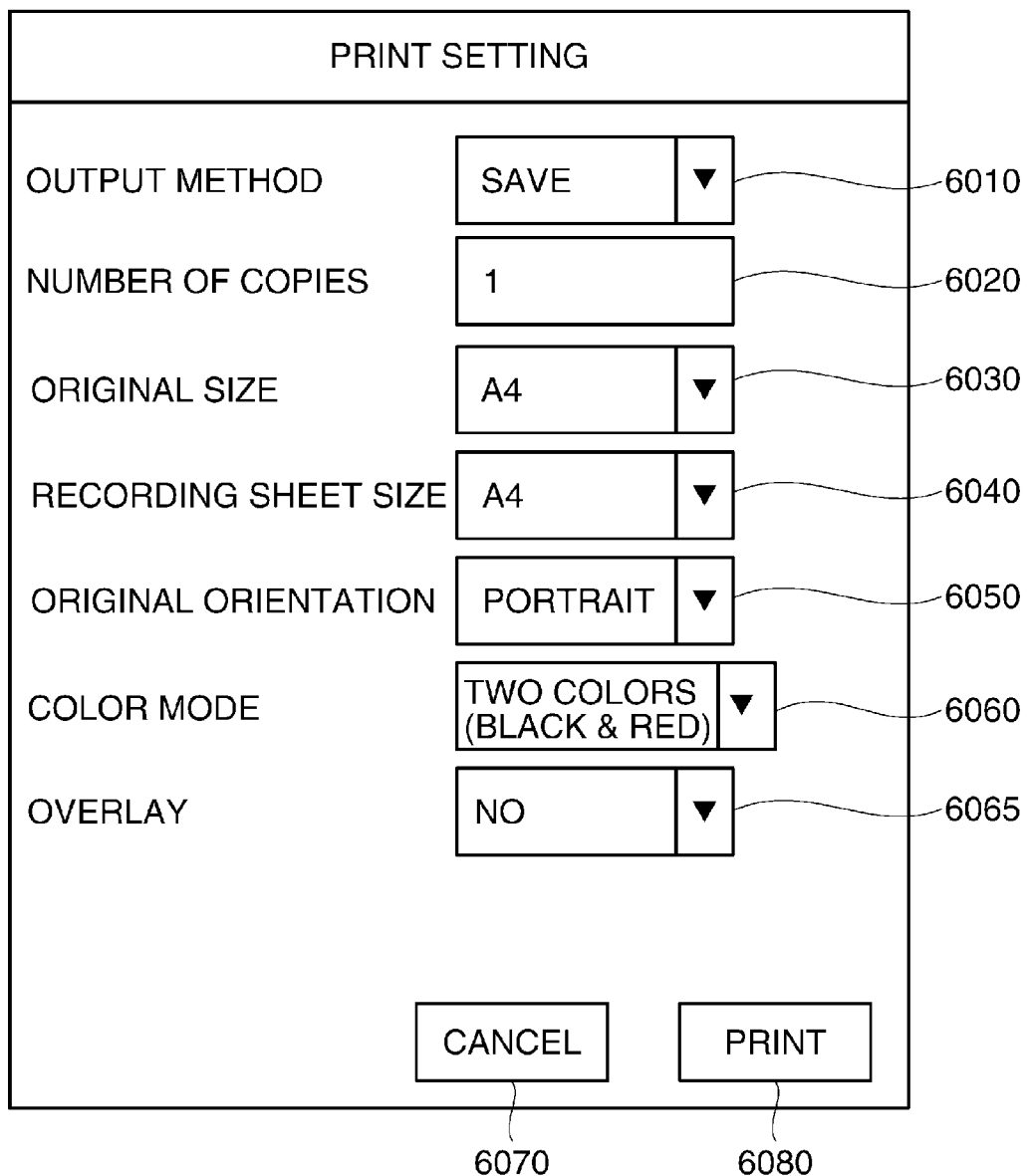
FIG. 4 is a view showing an example of a printer driver screen displayed on a PC shown in FIG. 1.

FIG. 4 is a view showing an example of a printer driver screen displayed on the PC 1007 shown in FIG. 1. As shown in FIG. 4, an output method box 6010 is a pull-down menu for specifying an output method to the image processing apparatus 1001. Here, "print", "save", etc. can be specified. When specifying "print", an image is printed on a recording sheet. When specifying "save", an image is stored into the HDD 2004 of the image processing apparatus 1001. In this embodiment, "save" is specified.

A number-of-copies box 6020 is a text box for specifying print copies numerically. One copy is specified in the embodiment.

An original size box 6030 is a pull-down menu for specifying an original size of the image data to be printed. Here, the original sizes, such as "A4", "B4", "A3", "LETTER", and "LEGAL", can be specified. In the embodiment, "A4" is specified.

A recording sheet size box 6040 is a pull-down menu for specifying a size of recording sheet that will be used for printing. Here, the sizes, such as "A4", "B4", "A3", "LETTER", and "LEGAL", can be specified. In the embodiment, "A4" is specified.

An original orientation box 6050 is a pull-down menu for specifying an orientation of an original to be printed. Here, "portrait" or "landscape" can be specified. In this embodiment, "portrait" is specified.

A color mode box 6060 is a pull-down menu for specifying the color mode for printing. As color mode, "full color", "black and white", "single color", and "two-color" can be specified, and an image will be printed with the specified colors.

In the single color mode, "single color (red)", "single color (green)", "single color (blue)", "single color (yellow)", "single color (magenta)", and "single color (cyan)" can be specified.

In the two-color mode, back and one more color can be specified like "two-color (black+red)", "two-color (black+green)", "two-color (black+blue)", "two-color (black+yellow)", "two-color (black+magenta)", and "two-color (black+cyan)". In this embodiment, "two-color (black+red)" is specified.

An overlay box 6065 is a pull down menu for specifying overlay. In this embodiment, no that shows not to overlay is specified.

When a cancel button 6070 is pushed, the screen will be closed and the display of the PC returns to the state before opening this screen. A print button 6080 is pushed, a PDL job is supplied to the image processing apparatus 1001. That is, when the print button is pushed, the PC 1007 generates attribute information and PDL data according to the specifications set by the menu, and supplies a PDL job to the image processing apparatus 1001 via the LAN 1005. At this time, the PDL data is generated as full color data. Then, the image processing apparatus 1001 receives the attribute information and the PDL data from the PC 1007 via the LAN 1005.

Figure 5:
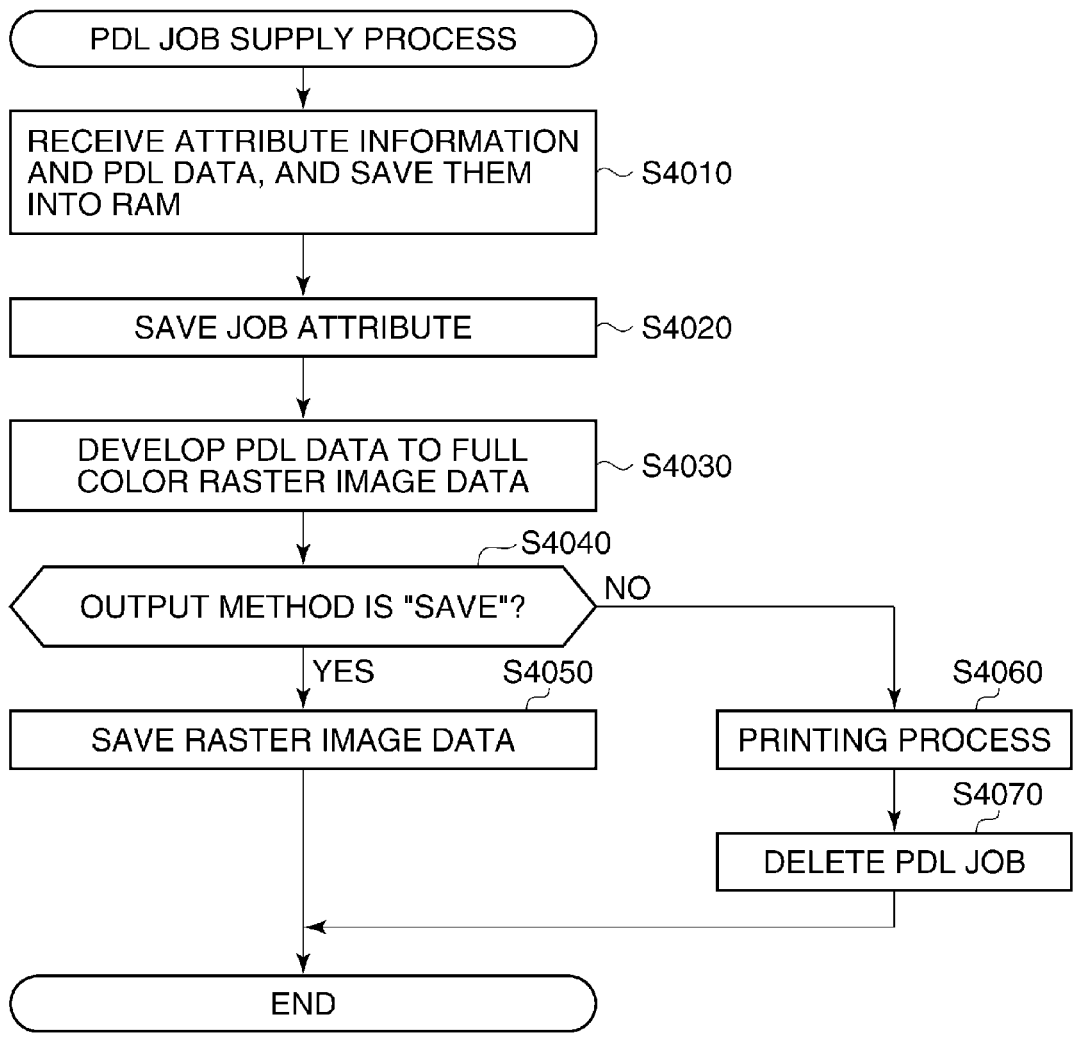
FIG. 5 is a flowchart showing a PDL job supply process executed by a CPU in FIG. 2.

FIG. 5 is a flowchart showing a PDL job supply process executed by the CPU 2001 in FIG. 2. The PDL job supply process in FIG. 5 is performed when the CPU 2001 reads the program of the PDL processing module 3018 and related programs that are saved in the HDD 2004 of the image processing apparatus 1001.

First, the network control module 3035 controls the network I/F 2010 so as to receive attribute information and PDL data that are contained in a PDL job via the LAN 1005, and saves them into a buffer inside the RAM 2002 temporarily (step S4010).

Next, the document management module 3050 saves the received attribute information as job attributes 5010 into the document information management module 3051 (step S4020). Details of the job attributes will be described below. As mentioned above, in the embodiment, the color mode of "two-color (black+red)", the number of copies of "one copy", the original size of "A4", the recording size of "A4", the orientation of original of "portrait", and the overlay of "no" are saved as the job attributes. The image processing apparatus 1001 gives a job ID for identifying the job at this time.

Next, the PDL data saved in the RAM 2002 are developed to full color raster image data in a format that can be printed by the printer 2095 onto the HDD 2004 (step S4030). Specifically, the PDL processing module 3018 controls the printer image processor 2090 using the image processing module 3037 to convert the PDL data into the raster image data. The full color raster image data is generated at this time, without converting into the colors designated by the color mode included in the attribute information. Accordingly, the raster image data here shows the image expressed in arbitrary colors. The image data is generated as one file for each page.

Next, it is determined whether the output method of the supplied PDL data is "save" or not (step S4040). When the output method is "save" (YES in the step S4040), the full color raster image data developed onto the HDD 2004 is saved into the HDD 2004 using the document management module 3050 (step S4050), and this process is finished. This process allows document box operation module 3015 to access the saved raster image data.

On the other hand, when the output method is not "save" (NO in the step S4040), a printing process is performed (step S4060). Specifically, an output image data is generated by reading the attribute information and the raster image data using the document management module 3050, and by performing the image processes, such as a color conversion process according to the color mode and a scaling process according to a combination of the original size and the recording sheet size, using the image processing module 3037.

The generated output image data is transmitted to the printer control module 3033 via the device control module 3031, and the printer 2095 prints it on a recording sheet. Next, the PDL job (attribute information, raster image data, output image data) that has been printed is deleted from the HDD 2004 (step S4070), and this process is finished.

According to the process in FIG. 5, the PDL data that expresses the image in arbitrary colors and the attribute information containing the color mode that specifies colors used when printing the PDL data are acquired (step S4010). Then, the acquired attribute information is saved (step S4020), and the full color raster image data developed without converting into the colors that are specified by the color mode contained in the acquired attribute information is saved (step S4050). As a result, the image data can be reused as the full color data and can be converted into the image data in different colors. Accordingly, it becomes recyclable [image data], without spoiling the convenience at the time of reuse of image data. Since image data is saved as raster image data that is obtained by developing PDL data, the decompression process becomes unnecessary when reusing the image data, and the printing time that is required to print the saved data can be shortened.

Figure 6:
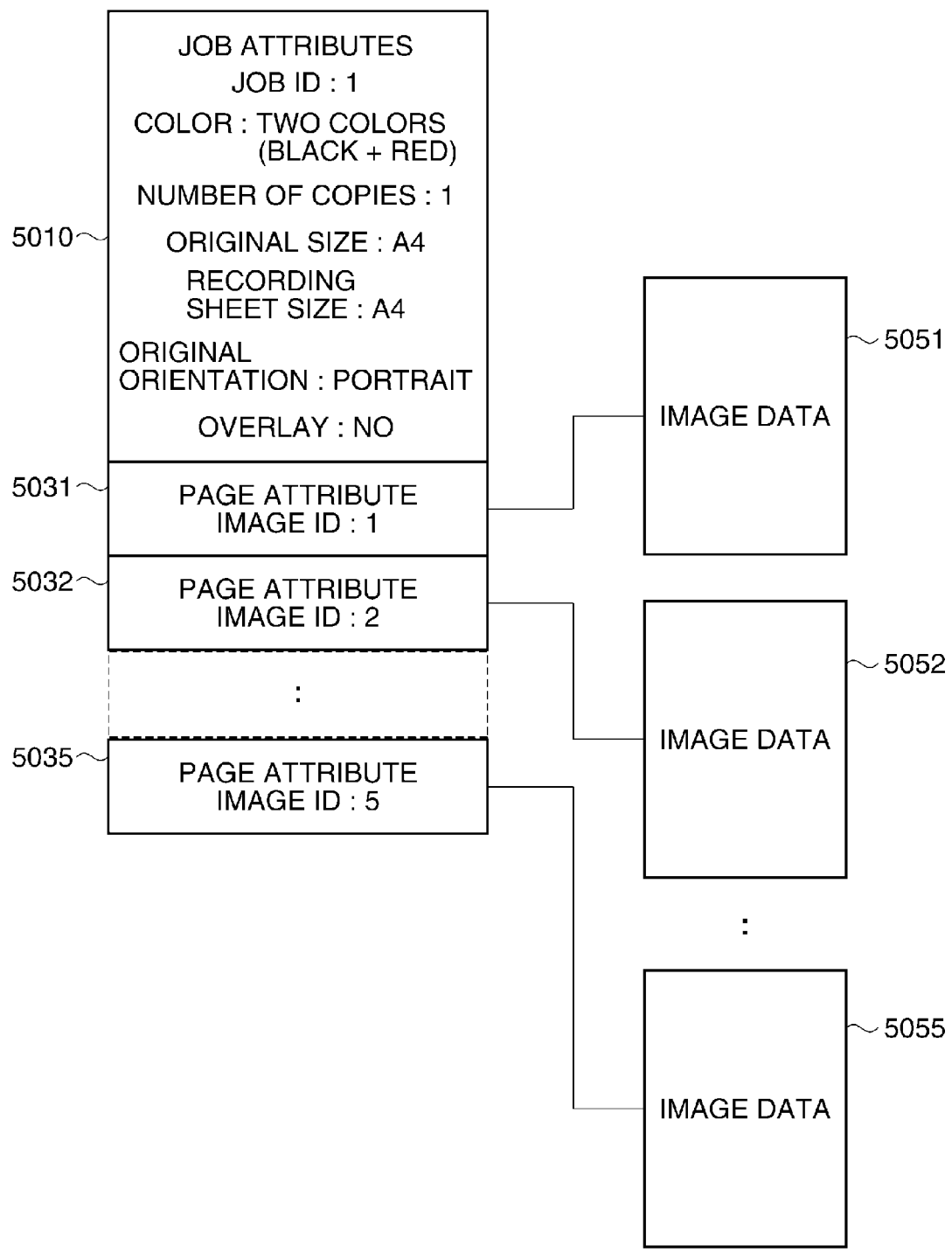
FIG. 6 is a view showing job attributes saved in a document management information module shown in FIG. 3.

FIG. 6 is a view showing the job attributes saved in the document information management module 3051. As shown in FIG. 6, the information relevant to a job, such as a job ID, a color mode (color information), the number of copies, an original size, a recording sheet size, an original orientation, and overlay, is included as the job attributes 5010 (attribute information). The job attributes 5010 can be read by inquiring the job ID from the document management module 3050.

Page attributes 5031, 5032, and 5035 for the respective pages are saved following the job attributes 5010. The page attribute is provided with an image ID (identification information) for identifying image data. Image data 5051, 5052, and 5055 can be read from the document management module 3050 by inquiring the image ID.

Thus, the job attributes contain the image ID for identifying image data that is expressed in arbitrary colors, and the color mode that specifies colors used when printing the image data identified by the image ID.

Next, a process in which a user operates the operation unit 2012 of the image processing apparatus 1001 so as to print a document (one or more pages of image data contained in one PDL job) that is saved in the HDD 2004 will be described.

Figure 7:
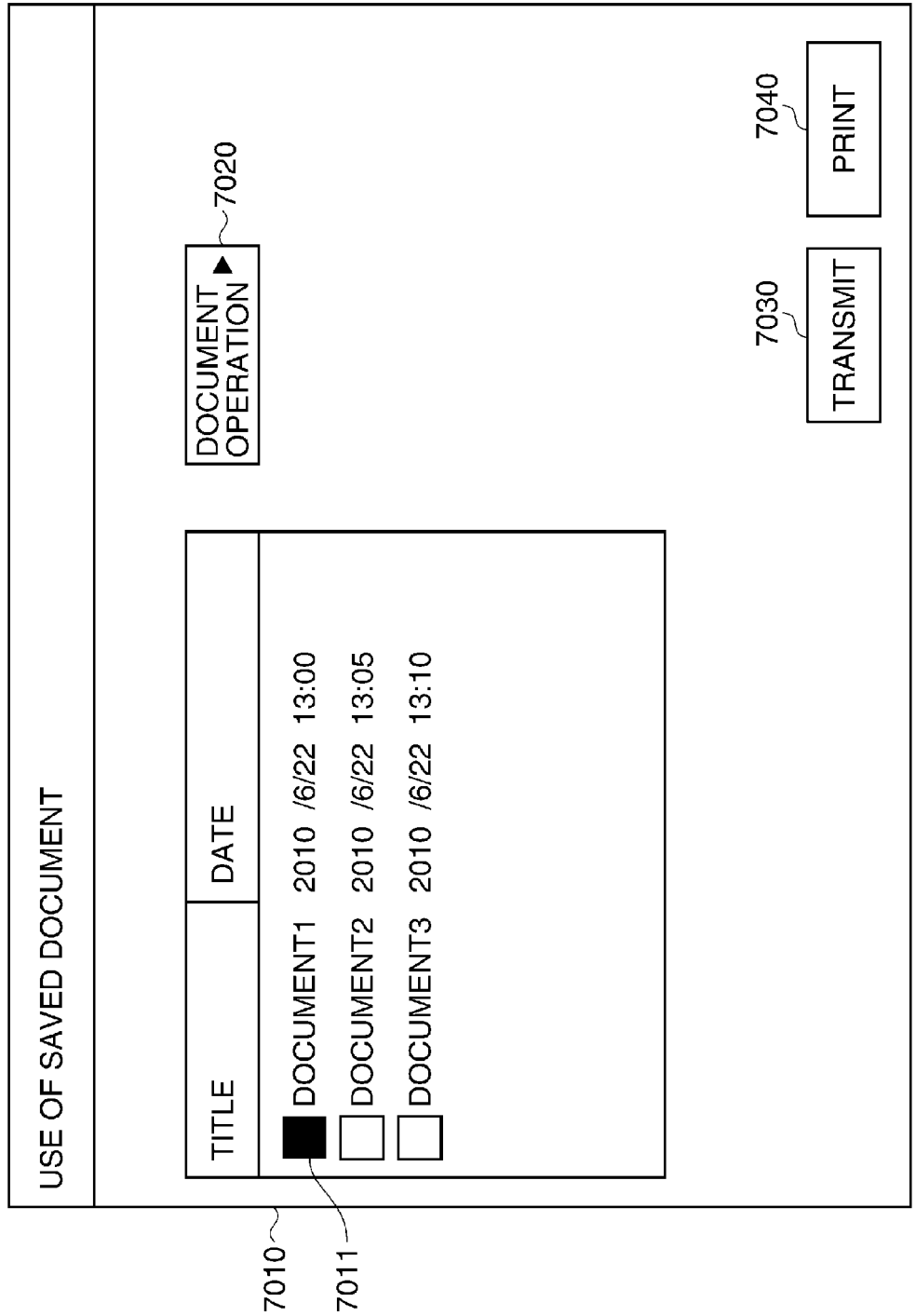
FIG. 7 is a view showing a screen example of a document list displayed on an operation unit in FIG. 2.

FIG. 7 is a view showing a screen example of a document list displayed on a touch panel of the operation unit 2012 in FIG. 2. As shown in FIG. 7, a list box 7010 in which a list of saved document is displayed, a document operation button 7020, a transmitting button 7030, and a print button 7040 are displayed on the screen.

A selection box 7011, a title, and a date are displayed in a line for every document in the list box 7010 for every document. In the list box 7010, the document of which the selection box, which is arranged at the left side of the title, is checked will be selected. The document 1 is selected in FIG. 7. An operation of the print button 7040 will display a print setting screen.

Figure 8:
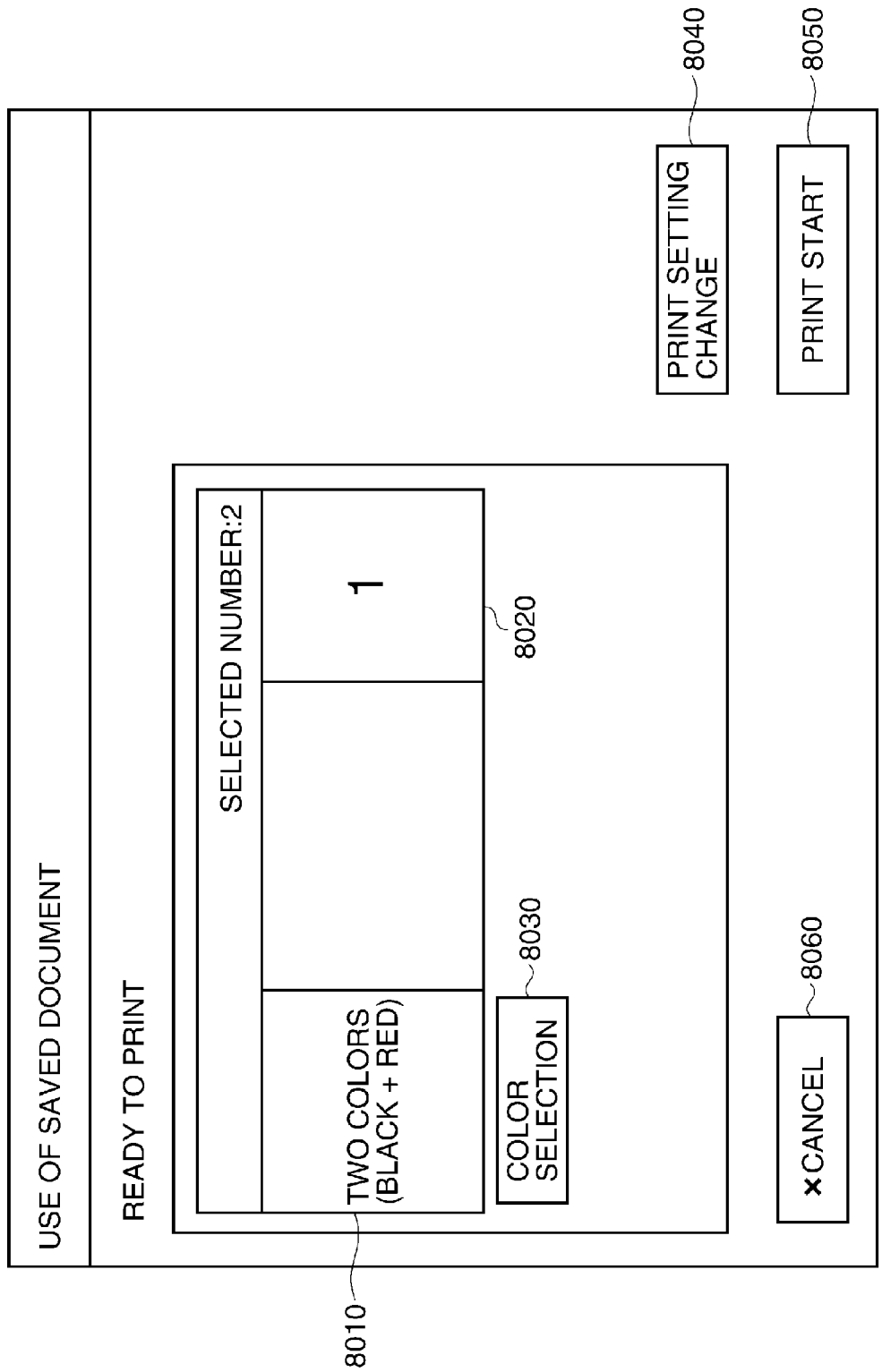
FIG. 8 is a view showing a print setting screen displayed on the operation unit in FIG. 2.

FIG. 8 is a view showing the print setting screen. In the print setting screen, a color mode display area 8010, a number-of-copies display area 8020, a color selection button 8030, a print setting change button 8040, a print start button 8050, and a cancel button 8060 are displayed.

The color mode and the number of copies that are stored in the job attributes 5010 of the selected document selected are displayed in the color mode display area 8010 and the number-of-copies display area 8020 in an initial state when the print setting screen is opened.

An operation of the print setting change button 8040 will update the job attribute 5010 with the changed print setting. Then, an operation of the color selection button 8030 will display a color mode selection screen.

Figure 9:
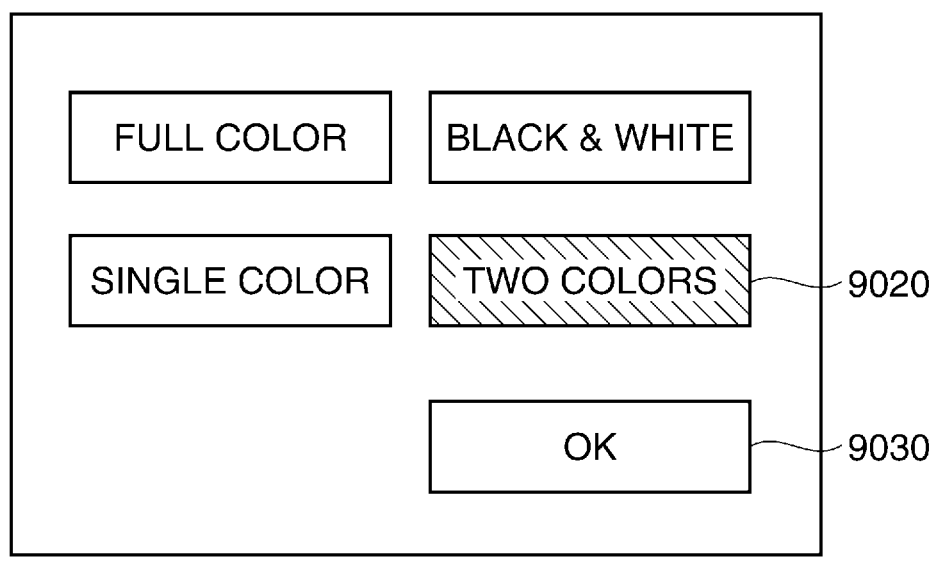
FIG. 9 is a view showing a color mode selection screen displayed on the operation unit in FIG. 2.

FIG. 9 is a view showing the color mode selection screen. In FIG. 9, the color mode is selectable from among four items of "full color", "black and white", "single color", and "two-color". The color mode specified in the job attributes 5010 is selected in an initial state. In the embodiment, the color mode of "two-color" is selected. When an OK button 9030 is operated, the selected color mode will be designated. Then, an operation of a two-color button 9020 will display a two-color selection screen.

Figure 10:
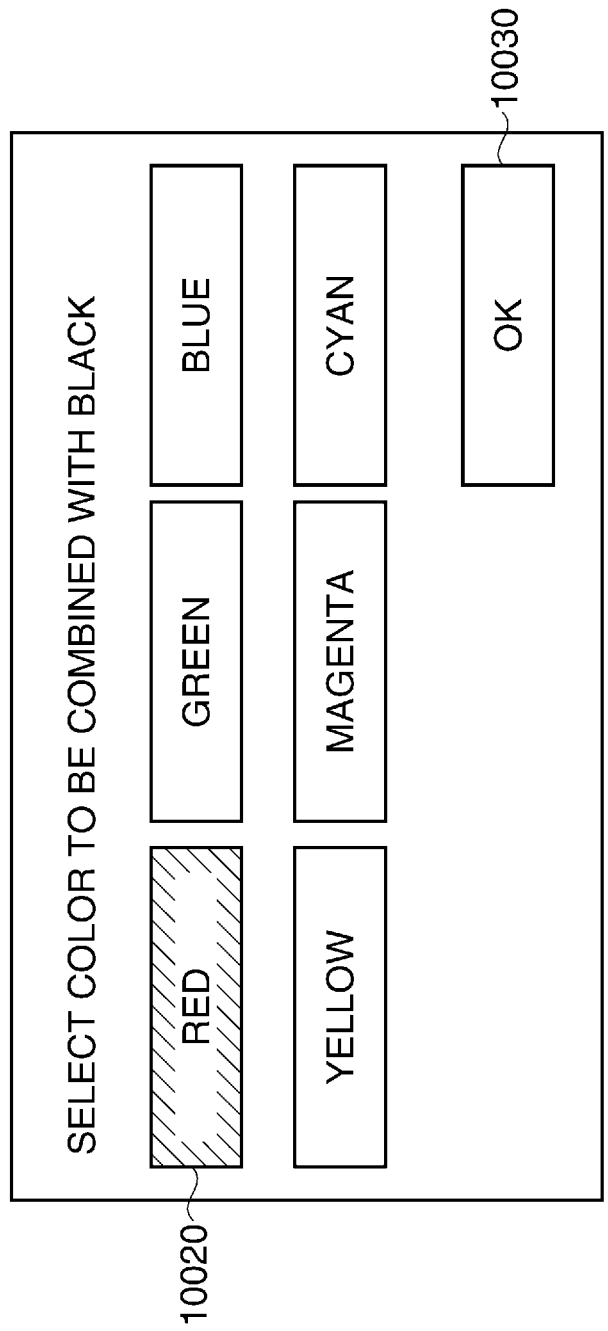
FIG. 10 is a view showing a two-color selection screen displayed on the operation unit in FIG. 2.

FIG. 10 is a view showing the two-color selection screen. In FIG. 10, a color used with black is selectable in the two-color selection screen. The selectable colors are "red", "green", "blue", "yellow", "magenta", and "cyan". In the embodiment, the red 10020 has been selected. When an OK button 10030 is operated, the selected color will be designated.

After setting with the screen mentioned above, the printing process will be started when the print start button 8050 shown in FIG. 8 is operated.

Figure 11:
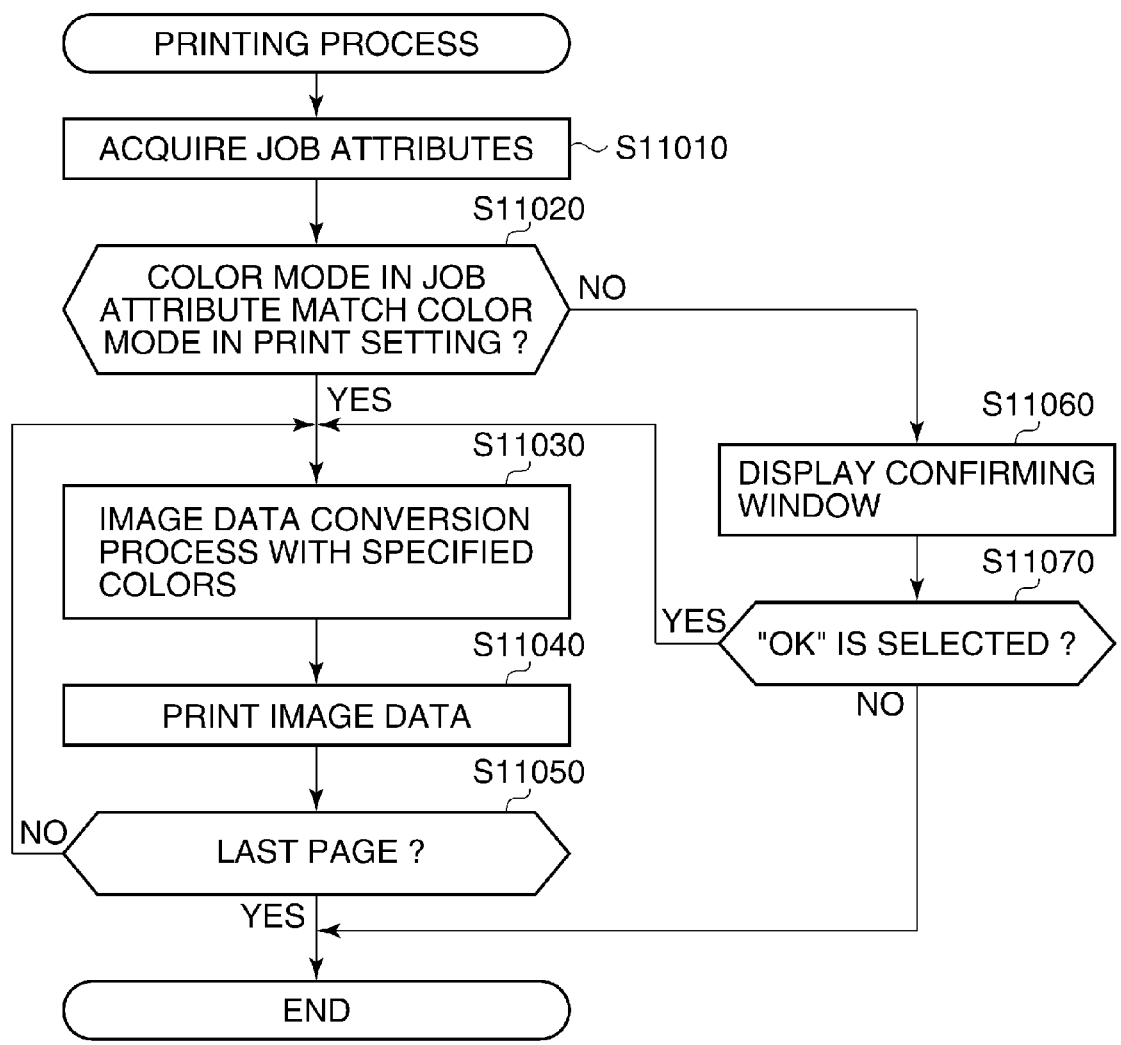
FIG. 11 is a flowchart showing a printing process executed by the CPU in FIG. 2.

FIG. 11 is a flowchart showing the printing process executed by the CPU 2001 in FIG. 2. The printing process is performed when the CPU 2001 reads the document box operation module 3015 and related programs saved in the HDD 2004.

In FIG. 11, the CPU 2001 acquires the job attributes 5010 using the document management module 3050 (step S11010). Next, the CPU 2001 determines whether the color mode in the acquired job attributes 5010 matches the color mode designated on the print screen 9010 (step S11020). That is, when the image data is printed, the CPU 2001 determines whether the colors specified by the user differ from the colors specified by the color mode contained in the attribute information.

When the color mode in the job attributes 5010 is the two-color (black+red), for example, the CPU 2001 determines that the colors are different when the color mode specified on the print screen 9010 is not the two-color (black+red).

When the color modes match (YES in the step S11020), the image data conversion process with the specified colors is performed (step S11030). Specifically, the output image data is generated by reading the image data of the document to be printed at every page, and by applying the color conversion process to the image data by controlling the image processing module 3037 according to the color mode specified on the print screen 9010. Since the conversion process is unnecessary when the specified color mode is the full color mode, the process in the step S11030 is skipped.

Next, one page of the data among the output image data generated by the conversion process is transmitted to the printer 2095 through the controls of the device control unit 3031 and the printer control unit 3033, and the data is printed on a recording sheet (step S11040).

Then, the CPU 2001 determines whether the data has been printed to the last page (step S11050). When the data has not been printed to the last page (NO in the step S11050), the process returns to the above-mentioned step S11030. When the data has been printed to the last page (YES in the step S11050), this process is finished.

On the other hand, when the CPU 2001 determines that the color modes do not match (NO in the step S11020), the CPU 2001 displays that the color mode in the job attributes differs from the color mode specified by the print setting. That is, the CPU 2001 warns the user that the colors differ. Here, a confirming window is displayed in order to make the user select whether to perform the printing process (step S11060). The user can select "OK" or "cancellation" in the confirming window.

Next, the CPU 2001 determines whether "OK" is selected or not (step S11070). When "OK" is selected (YES in the step S11070), the process proceeds to the above-mentioned step S11030. On the other hand, when "OK" is not selected (NO in the step S11070), this process is finished.

Accordingly, the print job saved in the two-color mode is not recklessly printed in the full color mode and the printing charge does not become higher than assumption. On the other hand, when the user permits the higher charge, the image can be printed in the full color mode.

Next, a process for transmitting a document saved in the HDD 2004 to the PC 1007 that is connected via the LAN 1005 by E-mail etc. will be described. When the transmitting button 7030 in the document list screen shown in FIG. 7 is operated, a transmission screen will be displayed.

Figure 12:
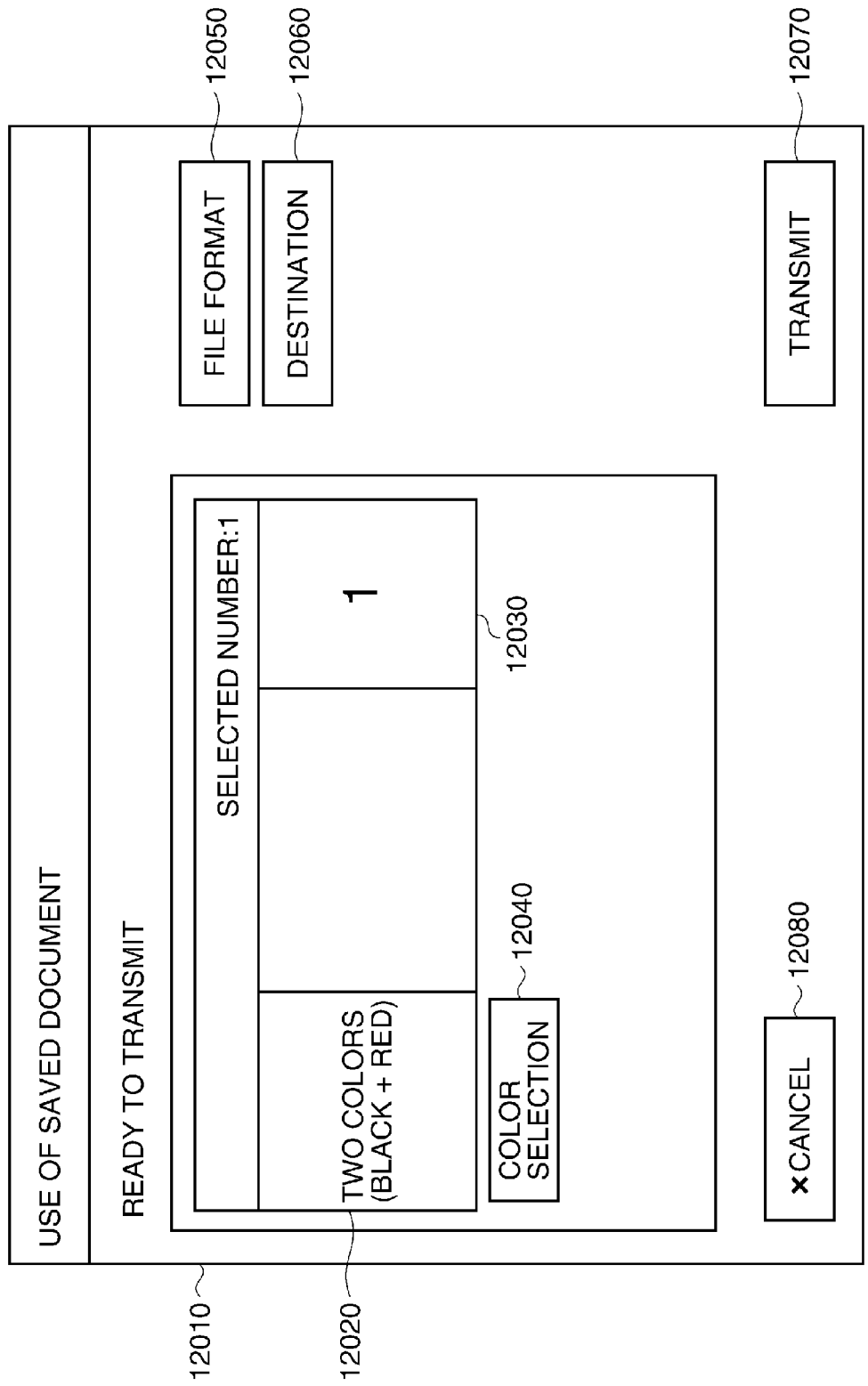
FIG. 12 is a view showing a transmission screen displayed on the operation unit in FIG. 2.

FIG. 12 is a view showing the transmission screen. As shown in FIG. 12, a color mode display area 12020, a number-of-copies display area 12030, a color selection button 12040, a file type button 12050, a destination button 12060, a transmitting button 12070, and a cancel button 12080 are displayed on the transmission screen 12010.

The color mode display area 12020, the number-of-copies display area 12030, and the color selection button 12040 work in the same ways as that in the print setting screen in FIG. 8.

When the file type button 12050 is operated, a sub menu for specifying a file format of a file to be transmitted is displayed, and the file format can be specified. Here, TIFF, JPEG, PDF, XPS, etc. are selectable.

Operation of the transmitting button 12070 will perform a transmitting process. The transmitting process will be described below. When the cancel button 12080 is operated, the process will be aborted and this screen will be erased. An operation of the destination button 12060 will display a destination screen.

Figure 13:
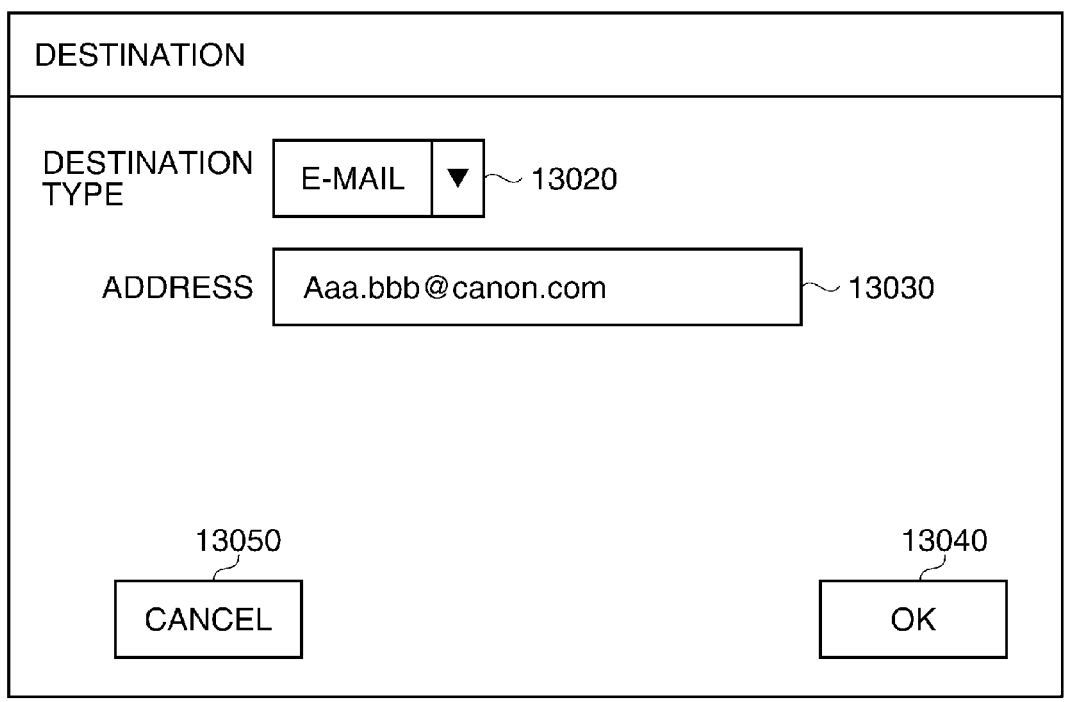
FIG. 13 is a view showing a destination screen displayed on the operation unit in FIG. 2.

FIG. 13 is a view showing the destination screen. As shown in FIG. 13, a destination type box 13020, an address box 13030, an OK button 13040, and a cancel button 13050 are displayed on the destination screen.

As the destination type 13020, "e-mail", "SMB shared folder", "FTP", "WebDAV", etc. can be specified, and "e-mail" is specified in FIG. 13.

An e-mail address is inputted into the address box 13030. It should be noted that an input item to the address box 13030 varies depending on the destination type. That is, a screen for inputting "folder path", "user ID", or "password" instead of "address" will be displayed depending on a protocol. When the OK button 13040 is operated, the inputted item will be specified as the address. When the cancel button 13050 is operated, the process will be aborted and this screen will be erased.

Figure 14:
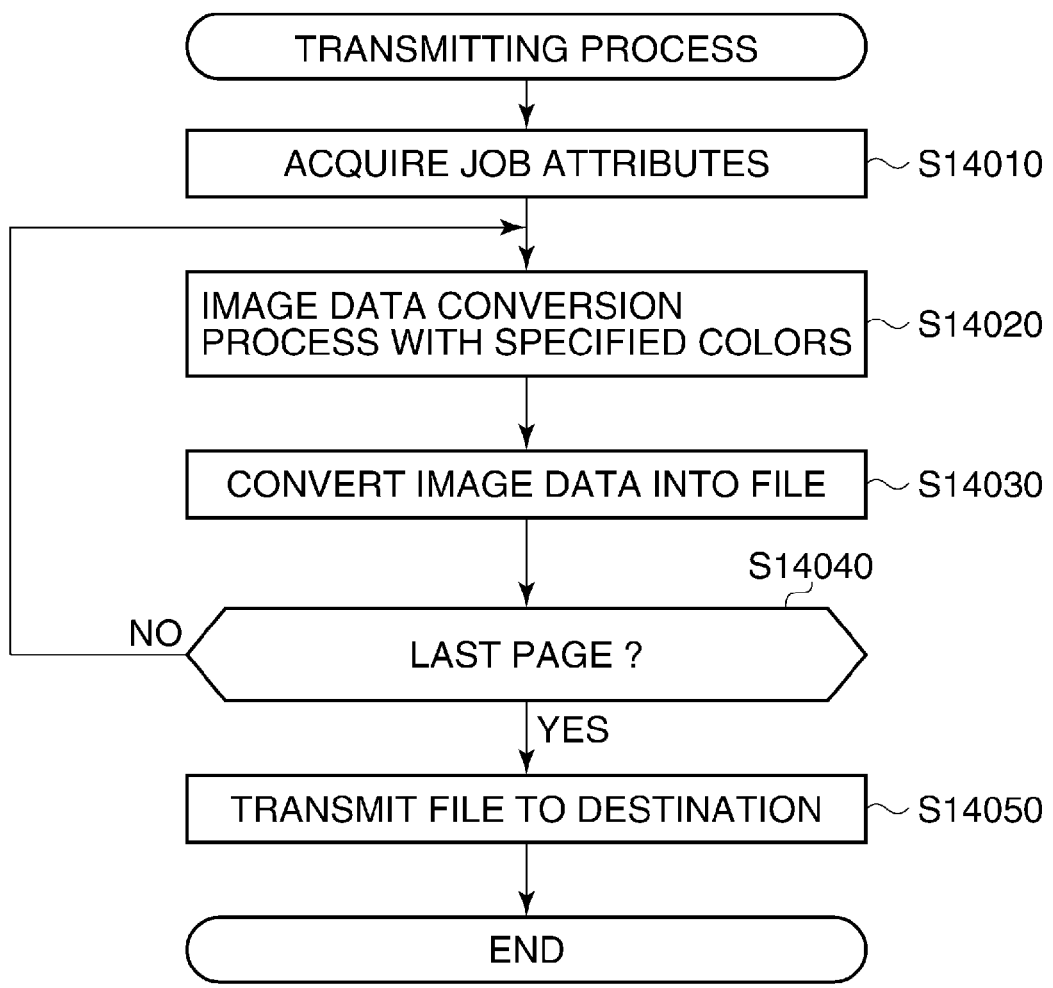
FIG. 14 is a flowchart showing a transmission process executed by the CPU in FIG. 2.

FIG. 14 is a flowchart showing the transmitting process executed by the CPU 2001 in FIG. 2. The transmitting process is performed when the CPU 2001 reads the transmitting operation module 3014 and related programs saved in the HDD 2004.

In FIG. 14, the CPU 2001 acquires the job attributes 5010 of the selected document using the document management module 3050 (step S14010).

Next, transmission image data is generated by reading the image data of the selected document at every page, and by applying the image conversion process to the image data by controlling the image processing module 3037 according to the color mode specified on the transmission screen 12010 (step S14020). Since the color conversion process is unnecessary when the specified color mode is the full color mode, the process in the step S14020 is skipped.

Next, the CPU 2001 converts the image data for one page generated in the specified file format into a file using the file converting module 3017 (step S14030).

Then, the CPU 2001 determines whether the data has been converted to the last page (step S14040). When the data has not been converted to the last page (NO in the step S14040), the process returns to the above-mentioned step S14020. When the data has been converted to the last page (YES in the step S14040), the CPU 2001 transmits the file to the destination designated in the destination designation screen (step S14050), and finishes this process.

The process in the step S14050 transmits the file to the destination using the network control module 3035. Since the process is well known, detailed explanation is omitted here.

Thereby, the user can transmit the raster image data saved as the two-color print job using a desired color mode. Thus, the process in FIG. 14 allows transmitting the saved full color raster image data or the raster image data in a new color mode generated by the image processing unit 3037 to other apparatuses.

Next, a document coupling process will be described. When the document operation button 7020 is operated in the document list screen in FIG. 7, a sub menu for a document operation is displayed. The sub menu includes a document attribute item for displaying the job attributes, a document coupling item for coupling documents, a deletion item for deleting a document, and a rename item for changing a title of document. The document coupling item can be operated only when two or more selection boxes in the document list are selected.

Figure 15:
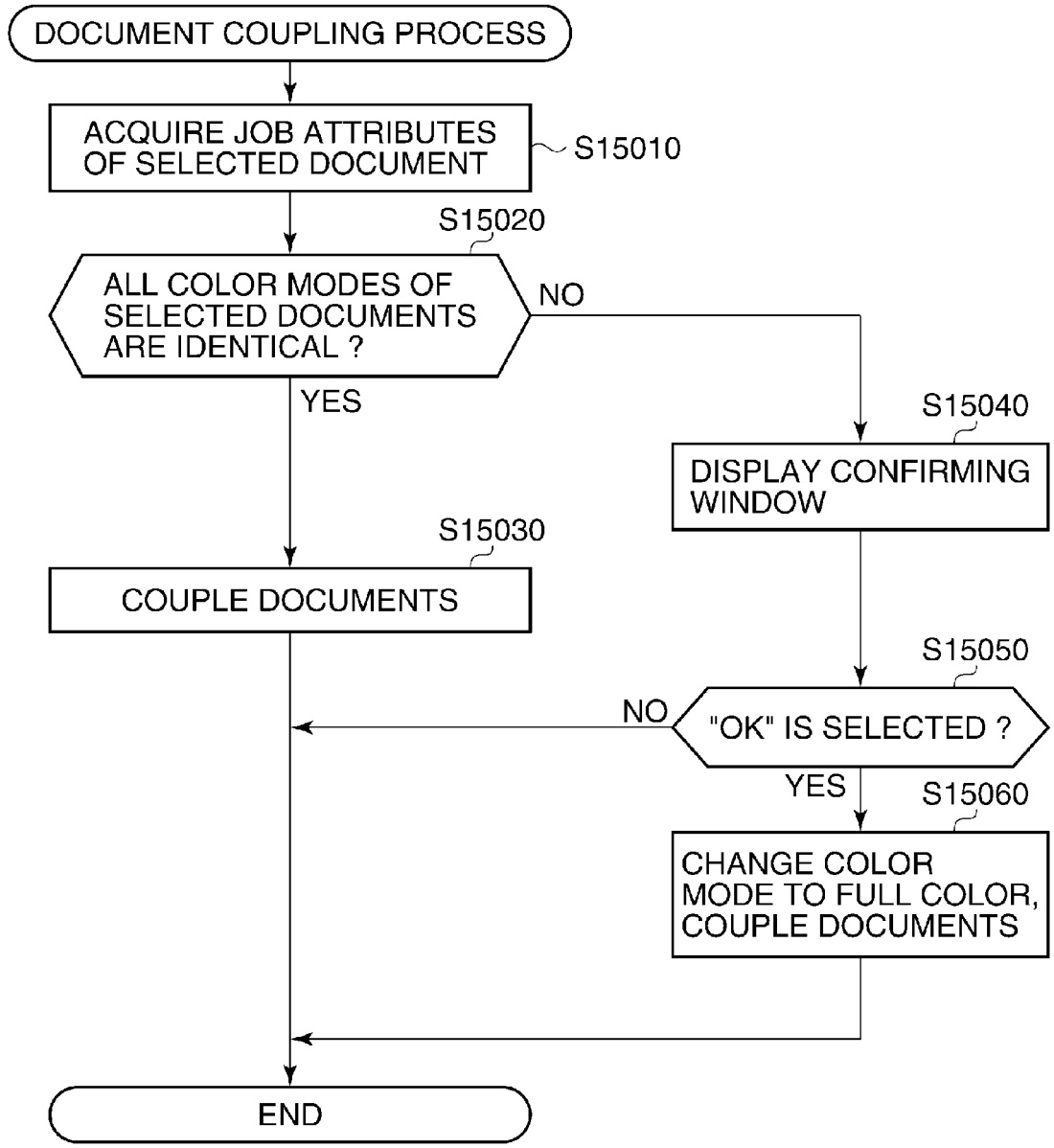
FIG. 15 is a flowchart showing a document coupling process executed by the CPU in FIG. 2.

FIG. 15 is a flowchart showing the document coupling process executed by the CPU 2001 in FIG. 2. The document coupling process is performed when the CPU 2001 reads the document box operation module 3015 and related programs saved in the HDD 2004.

In FIG. 15, the CPU 2001 acquires the job attributes 5010 of all the selected documents using the document management module 3050 (step S15010). Next, the CPU 2001 determines whether all the color modes of the selected documents are identical with reference to the acquired job attributes 5010 (step S15020).

When all the color modes are identical (YES in the step S15020), the CPU 2001 couples the documents (step S15030), and finishes this process. Specifically, the CPU 2001 leaves the job attributes 5010 of the first selected document, and deletes the job attributes 5010 of the following documents. Then, the CPU 2001 arranges the page attributes of first through last pages of the second document following the page attribute of the last page of the first selected document. Such a process is performed for every selected document.

When all the color modes are not identical (NO in the step S15020), the CPU 2001 displays a screen that warns the user that the color modes of the selected documents are not identical (step S15040). Moreover, the CPU 2001 displays a window showing that the documents can be coupled in the full color mode, and displays an OK button that permits coupling the documents and a cancel button in order to make the user be selectable.

Next, the CPU 2001 determines whether "OK" is selected or not (step S15050). When "OK" is selected (YES in the step S15050), the CPU 2001 changes the color mode to the full color mode, couples the documents (step S15060), and finishes this process. On the other hand, when "OK" is not selected (NO in the step S15050), this process is finished.

Thereby, the documents in different color modes can be coupled in the full color mode. When the full color print is not desirable, the user is allowed not to couple the documents. Thus, the process in FIG. 15 warns the user that the colors differ when the saved image data in the certain color mode is coupled to the other image data in a different color mode.

Figure 16:
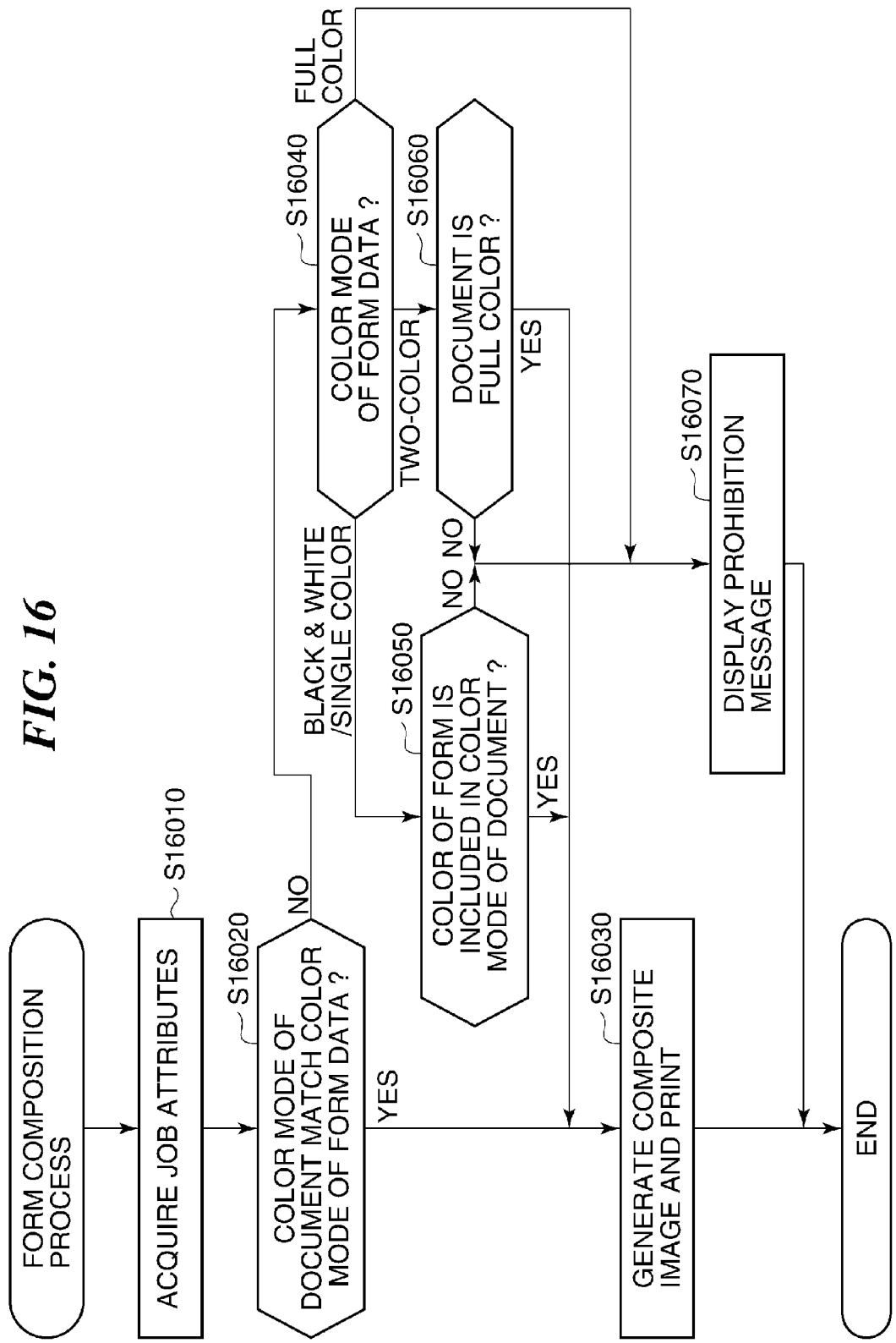
FIG. 16 is a flowchart showing a form composition process executed by the CPU in FIG. 2.

FIG. 16 is a flowchart showing a form composition process executed by the CPU 2001 in FIG. 2. The form composition process is performed when the CPU 2001 reads the document box operation module 3015 and related programs saved in the HDD 2004.

The form composition process is performed when printing a document of which a form-composition attribute of the job attributes 5010 specifies a form. The form shall be beforehand saved in the HDD 2004 via the document management module 3050.

The form data is special document data with one-page image data. For example, images, such as a company logo and copy prohibition, are widely used as the form data. The form data is image data of which the color cannot be changed.

In FIG. 16, the job attributes 5010 of the selected document and the specified form are acquired (step S16010). Next, the CPU 2001 determines whether the color mode of the document matches the color mode of the form with reference to the job attributes (step S16020).

Since the form composition printing can be performed without problems when the color modes are identical (YES in the step S16020), the CPU 2001 generates the composite image, prints it (step S16030), and finishes the process. On the other hand, when the color modes do not match (NO in the step S16020), the process branches depending on the color mode of the form data (step S16040).

When the color mode of the form data is "black and white" or "single color", the CPU 2001 determines whether the color mode of the document includes the color of the form (step S16050). That is, the CPU 2001 determines whether the colors used in the color mode of the document include the specified color of the form.

When the color mode of the document includes the color of the form (YES in the step S16050), the process proceeds to the step S16030. When the color mode of the document does not include the color of the form (NO in the step S16050), the CPU 2001 displays a prohibition message showing that the form composition print cannot be performed (step S16070), and finishes this process.

When the color mode of the form data is the full color mode as a result of determination in the step S16040, the process proceeds to the step S16070. When the color mode of the form data is the two-color mode as a result of determination in the step S16040, the CPU 2001 determines whether the color mode of the document is the full color mode (step S16060). When the color mode of the document is the full color mode (YES in the step S16060), the process proceeds to the step S16030. On the other hand, when the color mode of the document is not the full color mode (NO in the step S16060), the process proceeds to the step S16070.

For example, when the color mode of the form data is the single color mode (red) and the color mode of the document is the two-color mode (black+red) or the full color mode, the form composition printing is performed.

Thus, the process in FIG. 16 warns the user that the composition printing cannot be performed, when the colors of the color mode of the saved image data differ from the colors used in other image data that cannot change the colors.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-232777, filed on Oct. 24, 2011, which is hereby incorporated by reference herein in its entirety.

What is claimed is:

1. An image processing apparatus comprising:
    a receiving unit configured to receive data and attribute information of the data, the attribute information including at least first information indicating whether the data should be printed as an output image or stored, and second information indicating that the data is printed as an output image in a "two-color" mode;
    a raster conversion unit configured to convert the data into raster image data;
    a storage unit;
    a printing unit; and
    a control unit configured to determine, according to the attribute information, whether the data should be printed as an output image or stored,
    wherein in a case where it is determined that the data should be printed as an output image, said control unit executes a color conversion process in which the raster image data is converted, according to the attribute information, to two color image data, and subsequently executes a print process in which said printing unit outputs the two color image data, and
    in a case where it is determined that the data should be stored, said control unit controls said storage unit to store the raster image data together with the attribute information, without the raster image data converted to the two color image data.

2. The image processing apparatus according to claim 1, wherein said control unit is capable of printing or transmission of the raster image data stored in said storage unit.

3. The image processing apparatus according to claim 1, wherein the data received by said receiving unit is expressed by a page description language.

4. The image processing apparatus according to claim 1, wherein said control unit warns a user before printing the raster image data that is stored in said storage unit, when the color mode inputted by the user differs from the color mode of the raster image data.

5. The image processing apparatus according to claim 4, wherein said control unit causes a printing process to end without the output image data being printed in response to a user selection received after the warning to the user.

6. The image processing apparatus according to claim 1, further comprising a coupling unit configured to couple the raster image data that is stored in said storage unit to additional image data, and wherein said control unit warns a user when the color mode of the additional image data differs from the color mode of the raster image data.

7. The image processing apparatus according to claim 1, further comprising a composition unit configured to composite the raster image data that is stored in said storage unit with a form image that cannot change colors, and wherein said control unit warns a user when the colors of the form image are not included in the colors specified by the color mode of the raster image data.

8. The image processing apparatus according to claim 1, wherein the raster image data includes full color image data.

9. A control method for an image processing apparatus that is capable of two-color printing, the method comprising:
receiving data and attribute information of the data, the attribute information including at least first information indicating whether the data should be printed as an output image or stored, and second information indicating that the data is printed as an output image in a "two-color" mode;
converting the data into raster image data;
determining, according to the attribute information, whether the data should be printed as an output image or stored;
converting, in a case where it is determined that the data should be printed as an output image, the raster image data, according to the attribute information, to two color image data, and printing the two color image data; and
storing, in a case where it is determined that the data should be stored, the raster image data together with the attribute information, without the raster image data being converted to the two color image data.

10. A non-transitory computer-readable storage medium storing a control program causing a computer to execute a control method for an image processing apparatus that is capable of two-color printing, the control method comprising:
receiving data and attribute information of the data, the attribute information including at least first information indicating whether the data should be printed as an output image or stored, and second information indicating that the data is printed as an output image in a "two-color" mode;
converting the data into raster image data;
determining, according to the attribute information, whether the data should be printed as an output image or stored;
converting, in a case where it is determined that the data should be printed as an output image, the raster image data, according to the attribute information, to two color image data, and printing the two color image data; and
storing, in a case where it is determined that the data should be stored, the raster image data together with the attribute information, without the raster image data being converted to the two color image data.

11. An image processing apparatus comprising:
a receiving unit configured to receive data and color mode information indicating a two color mode;
a storage unit configured to store image data and the color mode information, the image data corresponding to the data received by said receiving unit, without at least a color conversion process executed thereon in accordance with the two color mode;
an accepting unit configured to accept, from a user, a print instruction for printing the image data that has been stored in said storage unit or a transmitting instruction for the image data that has been stored in said storage unit;
a conversion unit configured to execute, based on the print instruction accepted by the accepting unit, the color conversion process on the image data in accordance with the two color mode indicated by the color mode information stored in said storage unit;
a printing unit configured to print the image data on which the color conversion process is executed by said conversion unit; and
a transmitting control unit configured to execute, based on the transmission instruction accepted by the accepting unit, a transmitting process based on the image data stored in said storage unit, without the image data being converted into the two color image data by said conversion unit,
wherein the storage unit is configured to store the image data and the color mode information, without at least the color conversion process executed thereon in accordance with the two color mode, before the accepting unit accepts the print instruction or the transmission instruction from the user, the stored image data being raster image data.

12. The image processing apparatus according to claim 11, further comprising a full color conversion unit configured to convert the data received by said receiving unit into full color image data,
wherein said storage unit is configured to store the data which is received by said receiving unit and is converted by said full color conversion unit.

13. The image processing apparatus according to claim 11, wherein the two color mode is a mode in which the printing is executed by using two colors including black and a selected chromatic color.

14. The image processing apparatus according to claim 13, wherein the selected chromatic color is any one of red, green, and blue.

15. The image processing apparatus according to claim 13, wherein the selected chromatic color is any one of yellow, magenta, and cyan.

16. The image processing apparatus according to claim 11, wherein said accepting unit is configured to further accept, from the user, a change instruction for changing the setting of the two color mode, and
wherein, when said accepting unit has accepted, from the user, the change instruction as well as the print instruction, said conversion unit executes the color conversion process on the image data in accordance with the changed setting of the two color mode.

17. The image processing apparatus according to claim 11, wherein the data received by said receiving unit is expressed by a page description language.

18. A control method for an image processing apparatus, the method comprising:
receiving data and color mode information indicating a two color mode;
storing image data and the color mode information, the image data corresponding to the received data, without at least a color conversion process being executed thereon in accordance with the two color mode;
accepting, from a user, a print instruction for printing the stored image data or a transmitting instruction for the image data that has been stored in said storage unit;
executing, based on the accepted print instruction, the color conversion process on the image data in accordance with the two color mode indicated by the stored color mode information;
printing the image data on which the color conversion process has been executed; and
executing, based on the accepted transmission instruction, a transmitting process based on the image data stored in said storage unit, without the image data being converted into the two color image data, wherein the image data and the color mode information are stored, without at least the color conversion process executed thereon in accordance with the two color mode, before the the print instruction or the transmission instruction is accepted from the user, the stored image data being raster image data.

19. A non-transitory computer-readable storage medium storing a control program, which when executed, causes performance of a control method for an image processing apparatus, the control method comprising:

receiving data and color mode information indicating a two color mode;

storing image data and the color mode information, the image data corresponding to the received data, without at least a color conversion process being executed thereon in accordance with the two color mode;

accepting, from a user, a print instruction for printing the stored image data or a transmitting instruction for the image data that has been stored in said storage unit;

executing, based on the accepted print instruction, the color conversion process on the image data in accordance with the two color mode indicated by the stored color mode information;

printing the image data on which the color conversion process has been executed; and executing, based on the accepted transmission instruction, a transmitting process based on the image data stored in said storage unit, without the image data being converted into the two color image data, wherein the image data and the color mode information are stored, without at least the color conversion process executed thereon in accordance with the two color mode, before the the print instruction or the transmission instruction is accepted from the user, the stored image data being raster image data.

* * * * *